US007752672B2

(12) United States Patent
Karam et al.

(10) Patent No.: US 7,752,672 B2
(45) Date of Patent: Jul. 6, 2010

(54) METHODS AND APPARATUS FOR PHYSICAL LAYER SECURITY OF A NETWORK COMMUNICATIONS LINK

(75) Inventors: Roger Karam, Mountain View, CA (US); Robert Pryor Beliles, Jr., Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 1148 days.

(21) Appl. No.: 11/375,991

(22) Filed: Mar. 15, 2006

(65) Prior Publication Data

US 2007/0240213 A1 Oct. 11, 2007

(51) Int. Cl.
G06F 11/00 (2006.01)
(52) U.S. Cl. .......................................... 726/25; 726/26
(58) Field of Classification Search ...................... 726/4, 726/23–25, 26; 709/223–225; 713/187–188
See application file for complete search history.

(56) References Cited

U.S. PATENT DOCUMENTS

| 4,259,742 | A | * | 3/1981 | Burns et al. ................. 455/504 |
| 5,651,001 | A | * | 7/1997 | Alvstad et al. .............. 370/276 |
| 6,167,403 | A | * | 12/2000 | Whitmire et al. ............. 707/10 |
| 6,446,236 | B1 | * | 9/2002 | McEwen et al. ............ 714/795 |
| 6,650,622 | B1 |   | 11/2003 | Austerman, III et al. .... 370/241 |
| 7,180,889 | B1 | * | 2/2007 | Kung et al. .................. 370/352 |
| 2002/0083343 | A1 | * | 6/2002 | Crosbie et al. .............. 713/201 |
| 2004/0073597 | A1 |   | 4/2004 | Caveney et al. ............. 709/200 |
| 2005/0141431 | A1 | * | 6/2005 | Caveney et al. ............. 370/241 |
| 2005/0270036 | A1 | * | 12/2005 | Allan et al. ................. 324/543 |
| 2006/0023756 | A1 | * | 2/2006 | Meier ......................... 370/537 |
| 2007/0153937 | A1 | * | 7/2007 | Itkin et al. .................. 375/297 |
| 2007/0185689 | A1 | * | 8/2007 | Muraski et al. ............. 702/187 |

\* cited by examiner

*Primary Examiner*—Taghi T Arani
*Assistant Examiner*—Jason Lee
(74) *Attorney, Agent, or Firm*—BainwoodHuang

(57) ABSTRACT

A communications port of a network communications device maintains capability information indicating that under normal operating conditions a communications link is capable of operating in a secure mode in which communications signals of the communications link are unintelligible to an intruder having an unauthorized physical connection (e.g. tap) to the communications link. During operation, the port detects occurrence of a link event of a type that can invoke an automatic communications-mode control mechanism to change the operating of the communications link to a non-secure mode in which communications signals of the communications link are intelligible to such an intruder. An example is Ethernet auto-negotiation which can change from relatively secure 1000BaseT signaling to relatively non-secure 10/100BaseT signaling. Based on the capability information, the port responds to the link event by preventing the automatic communications mode control mechanism from changing the operating of the communications link to the non-secure mode.

28 Claims, 4 Drawing Sheets

METHODS AND APPARATUS FOR PHYSICAL LAYER SECURITY OF A NETWORK COMMUNICATIONS LINK

BACKGROUND

The present invention is related to the field of network communications.

In the field of network communications, there is often a distinction made between communications features and mechanisms that operate at a physical layer as opposed to those having a more "logical" or functional characteristic. An example of physical-layer features of a communications network include the physical cables between network elements or devices, along with the hardware interfaces to such cables within the network devices. Some network cables may be designed for use with optical communications signals, whereas other cables may be designed for use with non-optical electrical signals. An example of the latter type of cable includes standard "unshielded twisted pair" or UTP cables such as commonly employed in telephone and data communications systems. There is widespread use of so-called "Category 5" cable which includes multiple (e.g. 4) unshielded twisted pairs, each capable of data signaling rates on the order of 100 Mb/s.

The term "Ethernet" refers to a family of specifications for a widely used physical data communications technique that commonly employs a multi-twisted-pair cable such as Category 5 cable. According to respective specifications for 10BaseT and 100BaseT Ethernet, a point-to-point Ethernet link includes one twisted pair used for data transmission in one direction and a second twisted pair for data transmission in the other direction. Thus in each case a single twisted pair is used to carry the entire data communications signal from one end to the other. According to a more recent specification for 1000BaseT (also referred to as "gigabit Ethernet" or "GbE"), data transmission occurs in a more complex manner. A 1-Gb/s data signal is de-multiplexed into four 250-Mb/s signals, and each of these is transmitted over a corresponding one of 4 twisted pairs using a multi-level encoding scheme. Also, a duplex technique is employed such that transmission occurs in both directions simultaneously. That is, the signal appearing on any given twisted pair actually represents an electrical sum of a 250-Mb/s signal traveling in one direction and an independent 250-Mb/s signal traveling in the other direction. To receive data, a device at either end of the cable uses a technique referred to as "echo cancellation" to subtract its own transmission from the signal it receives from the cable, and thereby recover the signal that was transmitted by the far-end device.

Ethernet also employs a technique referred to as "auto-negotiation" by which two end devices on a point-to-point link engage in an initial dialogue to establish the speed at which the link is to operated along with other parameters such as whether half-duplex or full-duplex communications will be used. Generally, auto-negotiation is biased toward the communications mode that will deliver the highest performance. Thus if both ends of a link are capable of operating at 1000BaseT, for example, then such operation will be established automatically even though both ends might also be capable of lower-speed operation. In auto-negotiation, lower-speed operation will only be chosen if operation at higher speeds is not possible.

It has been known to use various security techniques within communications networks to provide protection from damage and/or unauthorized use. At the very highest levels, there can be passwords and similar mechanisms employed for authenticating users of applications and/or network resources. More at the level of network communications per se, it has been known to use data encryption techniques by which the payloads of data "packets" are made to be unintelligible to anybody who might intercept them and who is not privy to the encryption keys. Such techniques have been deployed at the more logical or functional layers of network operation, such as within applications programs, operating systems, and network communications drivers. Although they are also deployed at the physical layer, the circuitry for implementing them is very specialized and often expensive in terms of the area it requires on an integrated circuit.

SUMMARY

In addition to the security techniques as described above, there is a need for physical layer security techniques that are relatively simple and inexpensive, in order to protect communications networks and their users from the unauthorized activities of those who might attempt a physical intrusion into a network. As an example, an intruder may have access to a network communications cable known to be carrying communications of interest to the intruder. The intruder may employ a tap circuit to gain access to the communications signals carried by the cable. In some cases, such a tap circuit may provide for "eavesdropping" only (i.e., receiving the communications signal and deriving useful information from its contents), while in other situations an intruder may even attempt to assert control in some manner so as to more actively affect the operation of the network. Moreover, it may be that the communications signal carried by a communications cable at risk of such a tap is not encrypted or otherwise secured. It would be beneficial to utilize one or more security measures that more directly address such a specific physical intrusion scenario.

In particular, it is of interest to provide for greater physical security of Ethernet communications links because of their widespread use. It is noted in this respect that 1000BaseT Ethernet has some level of inherent protection by virtue of the duplex transmission technique, which requires that the transmission from one device be known in order to recover the transmission from the other device by using echo cancellation. An intruder who has simply tapped into the middle of a physical link presumably does not have access to the signal from either transmitter, and thus would be unable to perform the required echo cancellation to recover intelligible information. Thus an Ethernet link may have a dual characteristic from a security perspective. When operated at the lower 10/100 rates and single-pair unidirectional transmission, an Ethernet link is relatively non-secure and thus vulnerable to a physical intruder. However, when operated at the higher GbE rate and multi-pair duplex transmission, it is relatively secure and safe from such an intrusion. It would be beneficial to exploit the security aspect of 1000BaseT signaling in an Ethernet system, and to avoid the relative insecurity of signaling techniques such as 10/100.

In accordance with the present invention, a method is disclosed for operating a communications port of a network communications device such as a switch or router. The method includes maintaining capability information indicating that under normal operating conditions a communications link coupled to the communications port is capable of operating in a secure mode in which communications signals of the communications link are unintelligible to an intruder having an unauthorized physical connection to the communications link. An example of such a secure mode is 1000BaseT Ethernet signaling, as discussed above, with its full-duplex transmission over a common set of twisted pairs. The capability information may be stored in a memory of the communications port for example.

The communications port detects occurrence of a link event of a type that can invoke an automatic communications-mode control mechanism to change the operating of the communications link to a non-secure mode in which communications signals of the communications link are intelligible to such an intruder. An example of a link event that might invoke the automatic communications-mode control mechanism is a "link down". In the context of Ethernet, the role of automatic communications-control mechanism is played by auto-negotiation. As noted above, Ethernet auto-negotiation can automatically cause a link to operate at lower speed if for some reason operation at higher speed is not possible. When security is of concern, operation at lower speed may not be advisable, because in the case of 10/100 Ethernet, for example, it is much more easily intercepted than is 1000BaseT Ethernet.

Based on the capability information, the communications port responds to the detected occurrence of the link event by preventing the automatic communications mode control mechanism from changing the operation of the communications link to the non-secure mode. Again in the context of Ethernet, this operation implies that the auto-negotiation circuitry is somehow prevented from establishing operation at 10/100 speeds, avoiding the security risk. There are a variety of ways that this type of prevention can be performed, as described in more detail below. The techniques include disabling auto-negotiation and pre-setting the communication port to a fixed speed and duplex, in which case the occurrence of the link event cannot cause disabled 10/100 operation to occur.

In another embodiment of this disclosure, the two-pair auto-negotiation process may be modified to a secure mode to impede the detection of the 'content' or signal exchanges between end devices. Such a change may entail the negotiation to be a proprietary hard coded set of pulses to mask any useful content that may be detected easily over two pairs. Standard auto-negotiation pulses serve as energy indicators indicating the presence of a far end device, but proprietary signals serve as link negotiators to force 1000BT speed and turn on secure mode.

Also special inline power detection and classification identification networks (modified IEEE 802.3af mechanisms), or single pair identity networks discovered using the time-domain reflectometry (TDR), provide means to bypass auto-negotiation completely and force a secure mode to start on the link.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
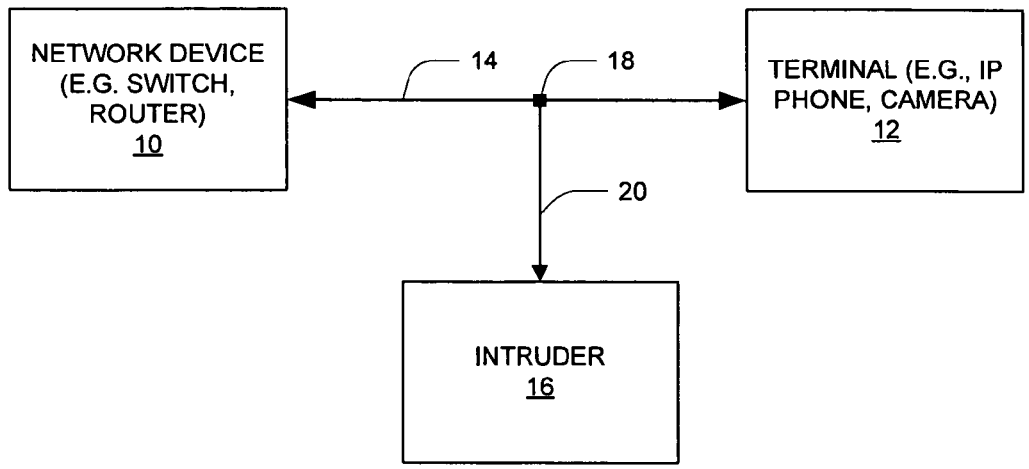
FIG. 1 is a block diagram of a communications system having a network device, a terminal, and a communications link that has been physically tapped by an intruder.

FIG. 1 shows a network communications device (network device) 10, such as a switch or router, coupled to a terminal 12 by a communications link 14. The connection within the network device 10 is typically made at a hardware interface referred to as a "communications port". The terminal 12 may generally be of any type that transmits and receives data via a communications network of which a communications link such as communications link 14 is a part. Examples of a terminal 12 include an Internet Protocol (IP) telephone (IP phone) or an IP camera use for surveillance for example. IP phones and cameras are good examples of terminals 12 that may benefit from the use of so-called "power over Ethernet" (POE) as specified in IEEE standard 802.3af, in which the terminal 12 draws its operating power from the network device 10 via the communications link 14. When POE circuitry is employed, it may also utilized be to provide certain security-related functions as described in more detail below.

In FIG. 1, an intruder 16 is shown having an unauthorized connection to the communications link 14 via a tap 18 and cable 20. This is an example of a communications security breach or intrusion having a physical aspect to it, i.e., resulting from the intruder 16 having physically tapped into a cable that constitutes the communications link 14. This type of intrusion is somewhat in contrast to the types of intrusions commonly referred to as "hacking", which involve obtaining access to a computer network or system through primarily software means, such as by tricking or otherwise defeating firewalls or similar software/protocol security mechanisms. A system or network may have points of particular vulnerability to physical intrusions, and thus it may be desirable to incorporate protection mechanisms particularly directed to a physical intrusion scenario such as depicted in FIG. 1.

Figure 2:
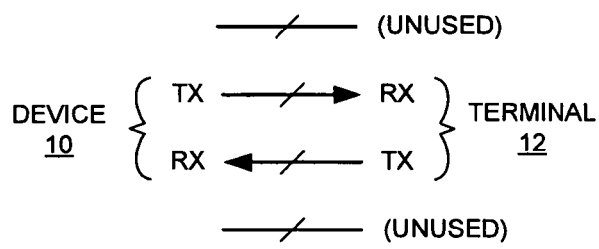
FIG. 2 is a schematic depiction of 4-pair unshielded twisted pair (UTP) cable and its use in 10/100 Ethernet signaling.

FIG. 2 illustrates the configuration of a very widely used data communications cable utilized for the communications link 14 which is generally referred to as "unshielded twisted pair" or UTP cabling. Data is carried in the form of digital communications signals appearing on individual twisted pairs. In one common arrangement, a single cable includes four such twisted pairs. FIG. 2 illustrates one particular use of 4-pair UTP cable in the context of Ethernet in particular. As shown, one pair is utilized exclusively for data transfer in one direction, for example from the network device 10 to the terminal 12 of FIG. 1. A second pair is utilized exclusively for data transfer in the other direction, for example from the terminal 12 to the network device 10. The other two pairs are unused. This configuration is employed for so-called 10BaseT and 100BaseT Ethernet signaling, which have signaling rates of 10 Mb/s and 100 Mb/s respectively and are also commonly referred to as "10/100" signaling.

The configuration shown in FIG. 2 is vulnerable to a physical intrusion such as depicted in FIG. 1. As long as the intruder 16 can avoid unduly affecting the quality of the communications signals appearing on the twisted pairs, the intruder 16 can easily receive each unidirectional data signal and employ widely available hardware to recover the information appearing in the form of packets etc. Moreover, the signals employed in 10/100 Ethernet signaling are sufficiently robust (relatively high amplitude and simple modulation) that it is relatively easy to achieve an electrical tap without unduly disturbing the signal. Because of this vulnerability, 10/100 Ethernet signaling may be described as a relatively non-secure mode of communications.

Figure 3:
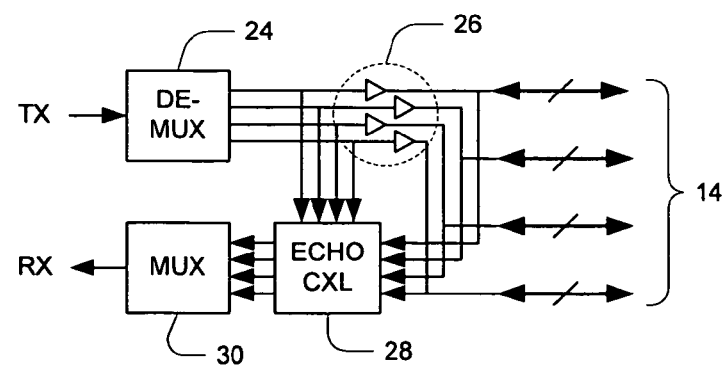
FIG. 3 is a block diagram of data transmission and reception circuitry used in connection with 1000BaseT Ethernet signaling.

FIG. 3 illustrates an alternative configuration used for communicating data over a 4-pair UTP cable of the same type that is used for 10/100 signaling such as depicted in FIG. 2. The configuration of FIG. 3 is employed in so-called 1000BaseT or "Gigabit" Ethernet (GbE) which has a signaling rate of 1 Gb/s. A 1-Gb/s transmit (TX) data signal is applied to a demultiplexer (DEMUX) 24, which divides the 1-Gb/s signal into four 250-Mb/s communications signals. These signals are supplied to respective UTP pairs via a set of drivers 26. At the same time that transmission is occurring from a device at one end of the link 14 in this manner, it is also occurring from a device at the other (far) end of the cable. Thus, this mode of communication is characterized by simultaneous transmission from both ends of the cable, such that the communications signals appearing on the twisted pairs of the cable represent the electrical sums of the respective communications signals transmitted by the two end devices. This is a particular form of "duplex" communications.

For reception, the communications signals from the twisted pairs are supplied to an echo canceller (ECHO CXL) circuit 28 along with the transmit signals generated by the demultiplexer 24. The echo canceller 28 electrically subtracts the transmit signals from the communications signals received from the cable in order to generate four output signals that carry the same information as the signals transmitted by the far end device. These four output signals are supplied to a multiplexer (MUX) 30 which combines them to generate a single 1-Gb/s receive (RX) signal.

It will be appreciated that the above-described duplex signaling technique that characterizes 1000BaseT has some level of inherent security, because it is difficult to recover the data stream transmitted from a given end device without knowing what was transmitted by the other end device. If the intruder 16 of FIG. 1 does not have access to the data being transmitted from one of the end devices, it cannot perform echo cancellation to recover the data transmitted from the other end device. The communications signals appearing on the twisted pairs are unintelligible to the intruder 16 by virtue of including simultaneous transmissions from two independent end devices. Additionally, 1000BaseT utilizes a complex multi-level signal that is more susceptible to noise and loading on the twisted pairs, making it more difficult for an intruder 16 to tap into the communications signal without causing a deleterious effect that can be detected. Thus 1000BaseT Ethernet signaling may be described as a relatively secure mode of communications.

It will be observed that the very same communications link 14 may be operated in either a secure mode or a non-secure mode. In the case of an Ethernet link employing 4-pair UTP cable, for example, it may be operated with 10/100 signaling such as illustrated in FIG. 2 and be vulnerable to intrusion (non-secure), or it may be operated using 1000BaseT signaling that is much more difficult for an intruder to recover useful information from (secure). One aspect of the presently disclosed technique for achieving communications security is to ensure, whenever possible, that such a communications link 14 be operated in the secure mode. If for some reason secure mode operation is not possible, then other steps can be taken to either prevent the link 14 from being operated in the non-secure mode or to limit non-secure operation to minimize risks that might arise. Specific techniques for doing so are disclosed herein.

Figure 4:
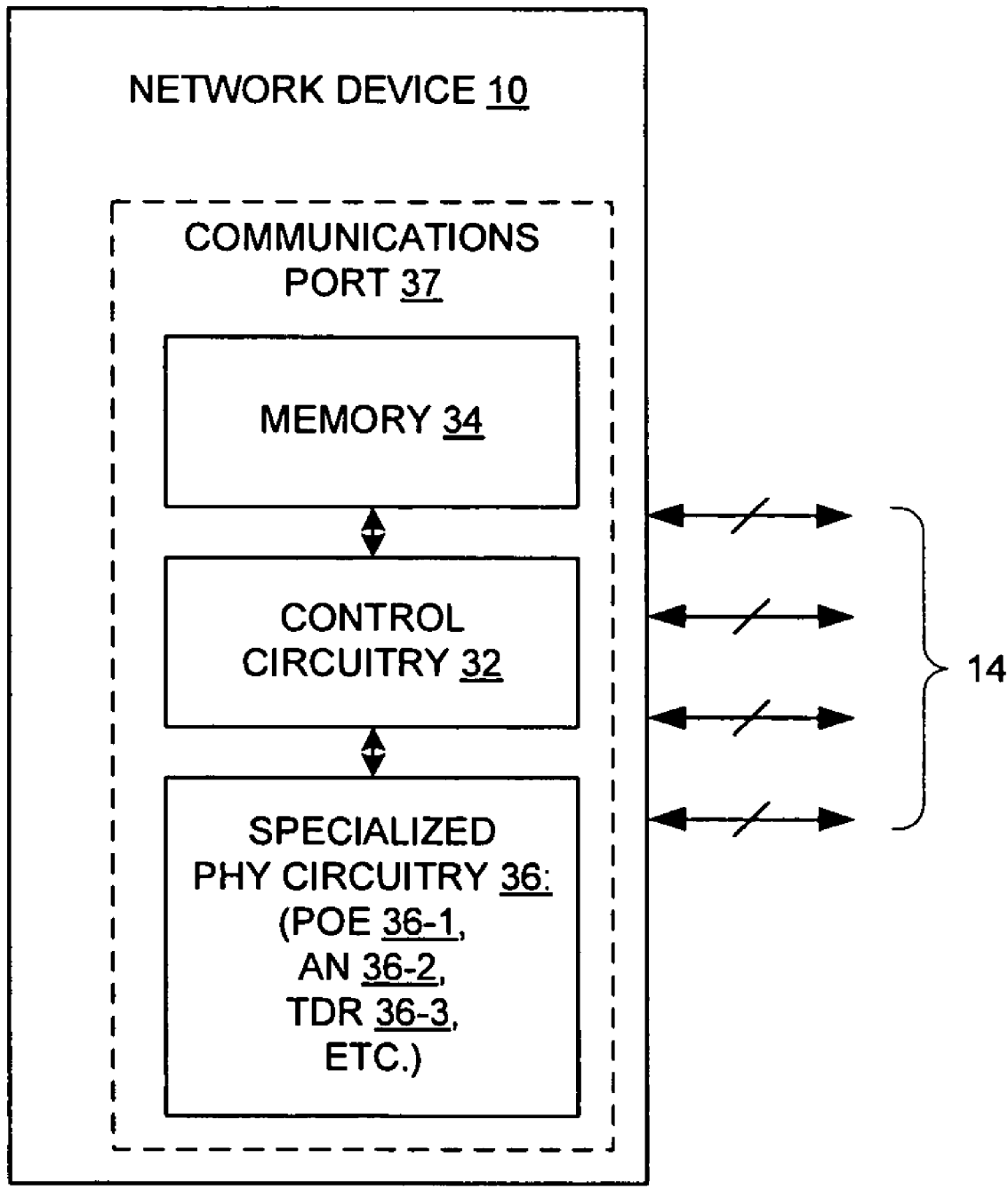
FIG. 4 is a block diagram of a network device, specifically a communications port of a network device, in the communications system of FIG. 1.

FIG. 4 shows a configuration of the network device 10. Control circuitry 32 is coupled to memory 34 as well as to specialized physical-layer (PHY) circuitry 36. Examples of such specialized PHY circuitry 36 in the context of Ethernet include power-over-Ethernet (POE) circuitry 36-1, auto-negotiation (AN) circuitry 36-2, time-domain reflectometry (TDR) circuitry 36-3, etc. The operation of such specialized PHY circuitry 36 is generally known. However, particular uses and/or modifications of the specialized PHY circuitry 36 are described herein for carrying out the presently disclosed techniques. The operations of the specialized PHY circuitry 36 are performed in conjunction with, and/or under the control and supervision of, the control circuitry 32. As indicated, the control circuitry 32, memory 34 and specialized PHY circuitry 36 may form part of a "communications port" 37, which as described above is a hardware interface to the communications link 14. A given network device 10 may have numerous such hardware interfaces, often implemented on so-called "line cards".

Briefly, Ethernet auto-negotiation is a process by which two end devices of an Ethernet communications link exchange certain information including information regarding their respective abilities to transmit at different speeds or data rates. Based on this exchange, each end device can then auto-configure itself to communicate appropriately on the communications link. As an example, if one device (such as network device 10) indicates during auto-negotiation that it is capable of operating at either 10 Mb/s or 100 Mb/s, the other end device (e.g., terminal 12) may configure itself for 100 Mb/s operation if that device is also capable of operating at 100 Mb/s. Currently, auto-negotiation and auto-configuration can be used to enable network devices to automatically choose among operation at 10 Mb/s, 100 Mb/s and 1 Gb/s for example. Thus it will be appreciated that the auto-negotiation process itself can influence whether an Ethernet link is operated in a secure mode (e.g. 1000BaseT) or a non-secure mode (10/100 signaling).

The presently disclosed technique involves the notion of a "secure communications port" of a network device 10. A set of one or more secure ports of a network device can be realized in a variety of ways. In one embodiment, the entire network device 10 may be utilized for a secure application, and thus it may be implicit in the operation of the network device 10 that all ports are secure ports and must be operated using the techniques described herein. Alternatively, it may be that only some of the ports of the network device 10 are secure ports. Secure ports can be identified in a manner that distinguishes them from non-secure ports, for example, by setting "personality" information of such secure ports on the network device 10 and/or having special classes of terminals 12 that when attached to a port of the network device 10 force the port into a special secure mode. Alternatively, terminals 12 may explicitly identify themselves as secure, such as through the use of POE inline power classification, a discovery protocol such as Cisco Discovery Protocol (CDP), physical-layer exchanges of proprietary signals and/or data, etc.

For secure ports having auto-negotiation enabled, some ports may be set to operate at 1000BaseT unless the attached terminals 12 supply class information allowing slower speed (i.e., non-secure) operation. There can be a menu of modes to support the secure mode and which may be application specific or set as a function of the attached terminal 12. It may require the input of a system manager to enable 10/100 operation via software and force communication to occur at lower speed. It may also be desirable to employ a user password to allow a network device 10 to operate the link 14 at a lower speed. The terminal 12 may also employ the same techniques to control security; either both sides of the link or only one side may activate the secure mode.

Figure 5:
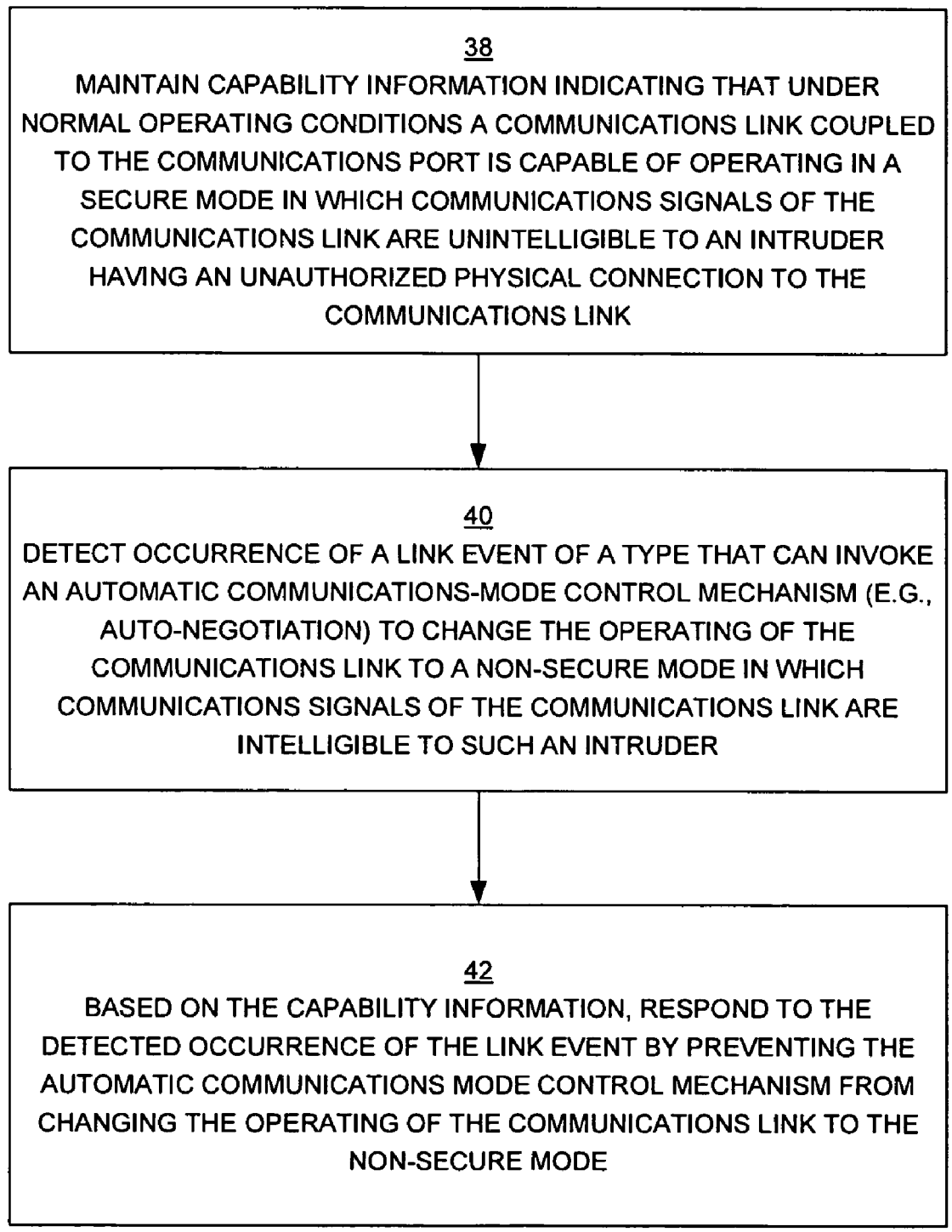
FIG. 5 is a flow diagram of a first method by which the communications port of FIG. 4 may be operated in accordance with the present invention.

Turning now to FIG. 5, there is shown a generalized process performed by the network device 10 with the aim of detecting an intrusion of the type shown in FIG. 1 and taking steps to prevent the intruder 16 from obtaining any beneficial use of the communications link 14, including the benefit of receiving useful information from the data signals transmitted on the link 14 by the network device 10 and the terminal 12. In step 38, the network device 10 maintains capability information indicating that under normal operating conditions a communications link coupled to a communications port of the network device 10 is capable of operating in a secure mode in which communications signals of the communications link are unintelligible to an intruder having an unauthorized physical connection to the communications link. As an example of such operation, the control circuitry 32 can monitor the operation of the link 14 via the specialized PHY circuitry 36, such as the auto-negotiation circuitry 36-2, to discover that the communications link 14 has successfully operated using 1000BaseT signaling. Such operation may have occurred after the most recent power-up event as a result of auto-negotiation. When such operation occurs, the control circuitry 32 can write a flag to the memory 34 as a reminder. This flag can later serve as the capability information indicating that under normal operating conditions the communications link 14 can be operated in this secure mode.

In step 40, the network device 10 detects occurrence of a link event of a type that can invoke an automatic communications-mode control mechanism to change the operating of the communications link to a non-secure mode in which communications signals of the communications link are intelligible to such an intruder. An example of such an automatic communications-mode control mechanism is the above-described Ethernet auto-negotiation circuitry 36-2, which can automatically select one of a set of operating speeds and, implicitly, one of a set of signaling schemes. The link event of concern here is one that would cause the automatic communications-mode control mechanism to change the communications mode to one in which the communications signals are more easily intercepted and utilized by an intruder (i.e. intelligible), such as for example 10/100 signaling with its unidirectional data transmission on different twisted pairs. Examples of such a link event include the following:

1. Complete loss of link or "link down" (link becomes non-operational for data transfer), which can be caused for example by unplugging the cable or some complete failure of the communications circuitry on either end.
2. Sudden appearance of data/bit errors on the link.
3. Sudden drop in data signal amplitude, even if insufficient to interfere with successful data reception
4. Detection of potential changes to the physical link as might be reported by TDR that is periodically performed. For example, the TDR circuitry 36-3 might report that the cable is suddenly longer or shorter.
5. In the case of a link employing POE, a mismatch detected between the current/power being supplied (e.g. by the network device 10) and the current/power being drawn (e.g. by the terminal 12)
6. Also in the case of POE, a sudden drop in the current/power being supplied to zero even though the link stays up (operational for data transfer)

In an operating communications system, some or all of the above link events might cause Ethernet auto-negotiation circuitry 36-2 to begin to operate in order to resume data communications, and the auto negotiation process might settle on one of the non-secure modes (such as 100BaseT or 10BaseT) rather than resuming operation in the secure mode (e.g., 1000BaseT). This is a scenario of concern from a security perspective.

As a particular example of a link event that might be caused by an intruder 16, imagine that the intruder 16 cuts one of the twisted pairs that is not used to carry data when 10/100 signaling is used on a 4-pair UTP cable (e.g. the top-most pair in FIG. 2). In such a case, if the link is operating with 1000BaseT signaling (which uses all four twisted pairs), it will begin to experience a severe error rate. When auto-negotiation is performed after such a failure, it determines that operation using 1000BaseT signaling is not possible, but that operation at 10/100 is possible. If operation at 10/100 were then to ensue, the intruder 16 would have successfully forced the communications link 14 out of a secure mode of operation and into a non-secure mode of operation, such that the intruder 16 can thereafter easily eavesdrop on the communications.

Thus in the process of FIG. 5, specifically in step 42, the network device 10 takes action in response to the detected occurrence of the link event. Because the network device 10 knows from the stored capability information that the communications link 14 can be operated in the secure mode, the network device 10 actively prevents the automatic communications-mode control mechanism from changing the operating of the communications link to the non-secure mode. This can be done in several ways. In the illustrated embodiment for example, the control circuitry 32 (FIG. 4) may provide an input to the auto-negotiation circuitry 36-2 to either prevent it from selecting 10/100 operation or to prevent it from operating at all. Operation can be re-enabled at some future time after the event has been reported to a system manager to provide an opportunity to investigate any new communications security risks (e.g., a physical inspection of the link 14 to make sure that it has not been tapped into). Potentially upon the detection of an intrusion, the link 14 may be supplied with fictitious data to fool an intruder 16 into thinking that his attempt is successful, enabling the system manager to find the intrusion point.

For secure ports, after any one of the events listed above (and/or other events that may not be listed), a variety of checks can be made to insure that no physical changes occurred that caused the event(s) to be detected by the network device 10. For security reasons, it is assumed that the event reflects a security risk until some additional action has been taken that indicates otherwise. Today, upon a link failure, Ethernet ports automatically restart the auto-negotiation process, and resume data transfer at whatever speed and duplex are agreed upon. For secure ports, it is preferred to perform one or more of a variety of checks before auto-negotiation restarts.

As an example, secure ports can use TDR to check the integrity of the twisted pairs of the UTP cable after operation using 1000BaseT has successfully occurred. The presence of a fault such as a short or open might indicate that an intruder 16 has attempted to force the link 14 to be operated at 10/100. In this case, the network device 10 can refuse to operate the port until any faults have been corrected. Also, a system manager can be notified, and the time can be recorded. Note that inline power detection circuitry can also be used to detect an open or short on a cable. In addition, signal amplitude measurements can be done to make sure that no physical operational parameters have changed. These can be detected by the exchange of amplitude and or delay (phase shift) data for the three speeds 10/100/1000BT between the attached devices. These measurements are done on both devices (e.g., network device 10 and terminal 12), shared between the two devices, and stored in non-volatile storage ahead of any initial data transfer. These values can be used as a reference to compare with values obtained after any of the above link events occurs.

It may be desirable to give a user limited access to some basic functions or applications. If the terminal 12 is an IP phone, for example, the user may be permitted to place emergency calls, which could be implemented as a set of particular called telephone numbers that are allowed. It may also be desirable to permit the link 14 to be operated in the non-secure mode (e.g., 100BaseT) while the user's activity is monitored and perhaps a password is requested. This protective functionality can be provided within the network device 10, perhaps in conjunction with a separate network management system (not shown).

Figure 6:
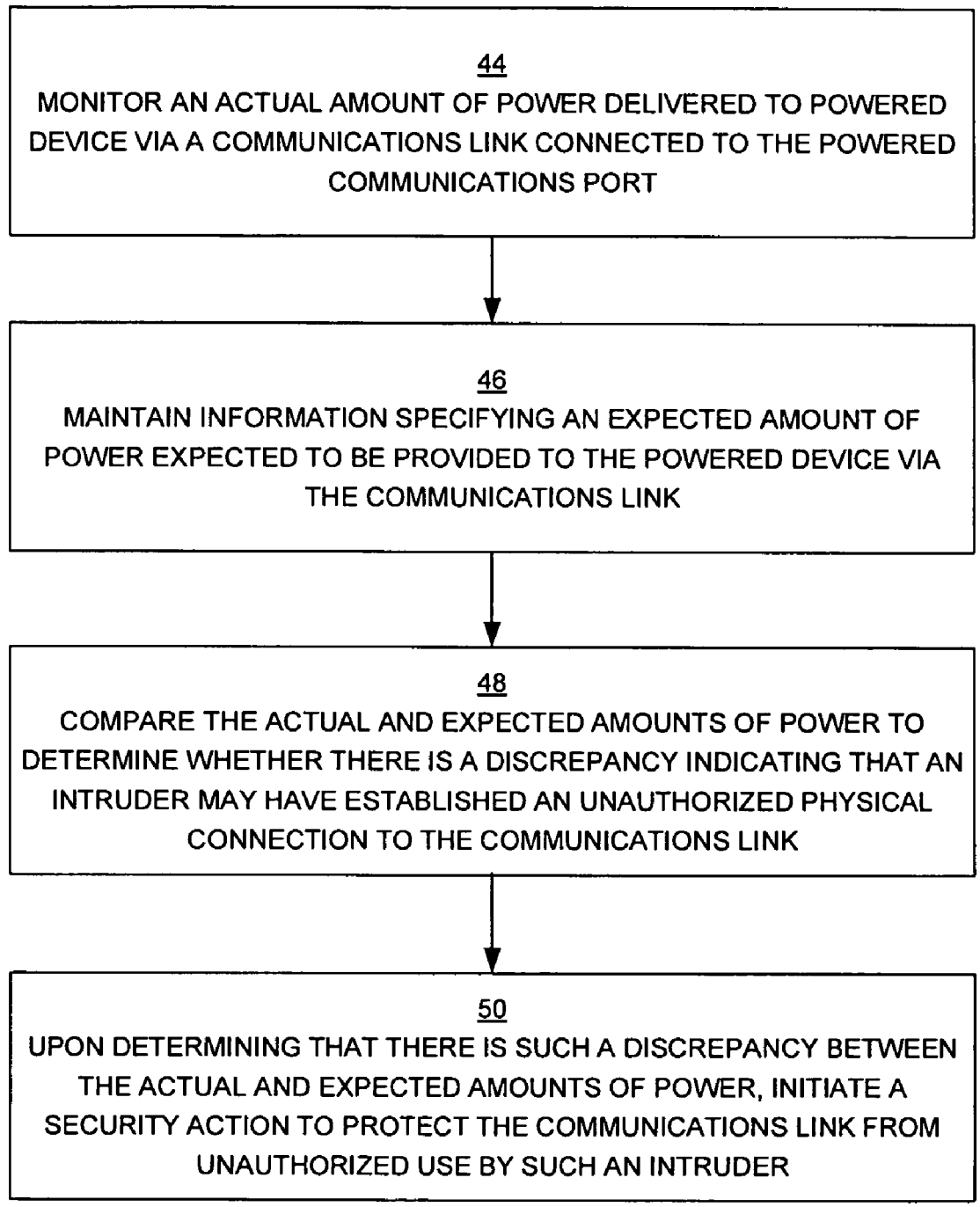
FIG. 6 is a flow diagram of a second method by which the communications port of FIG. 4 may be operated in accordance with the present invention.

FIG. 6 illustrates another communications security method that is specific to powered communications links 14 such as those employing POE. In this method the POE circuitry 36-1 can be used to detect certain types of link events that might indicate the presence of an intruder 16. The method of FIG. 6 may be performed at a "powered communications port" such as a physical Ethernet port of the network device 10 that provides power to a link 14 in accordance with POE standards. For example, the method can be performed by the control circuitry 32 in conjunction with the POE circuitry 36-2 in the embodiment of FIG. 4.

In step 44, monitoring circuitry monitors the actual amount of power being delivered to a powered device (e.g. terminal 12) via a communications link connected to the powered communications port. In the embodiment of FIG. 1 and 4, this monitoring circuitry may consist of the POE circuitry 36-2 in conjunction with the control circuitry 32.

In step 46 of the method of FIG. 6, information is maintained that specifies an expected amount of power expected to be provided to the powered device via the communications link. This information can be obtained in a variety of ways as described in more detail below. In the embodiment of FIGS. 1 and 4, this information can be stored in the memory 34.

In step 48 the actual and expected amounts of power are compared to determine whether there is a discrepancy indicating that an intruder may have established an unauthorized physical connection to the communications link. Such a discrepancy might arise in a variety of ways. In one scenario, the intruder's tap 18 includes not only circuitry for receiving the data signals from the link 14 but also circuitry that extracts power being supplied by the network device 10. An intruder 16 who is sufficiently versed in POE technology can easily include the required isolation and power-conditioning circuitry to obtain power from the communications link 14, and would be rewarded with a self-powered eavesdropping setup that could be utilized indefinitely if not detected and disabled. By comparing the amount of power being supplied by the network device 10 with that being drawn by the terminal 12, for example, the network device 10 could detect a sufficiently large diversion of power.

In step 50, upon determining that there is such a discrepancy between the actual and expected amounts of power, a security action is initiated to protect the communications link from unauthorized use by such an intruder. In the above example, an alert might be provided to a system manager who can take appropriate action, such as initiating a physical inspection of the communications link 14 which would uncover the presence of the tap 18.

The end device (e.g. terminal 12) may have a current profile measured at manufacturing time for each of its operating modes and stored in a read-only memory (ROM), and then once it powers up it can supply a current profile during use to the other end device (e.g. network device 10). Or the network device 10 may load such a profile in another manner. In the case of a rotatable security camera, for example, the profile of the current it draws when being rotated may be stored in the network device 10 and/or dynamically agreed upon or shared with the network device 10 via packet exchanges or other communications ahead of such action. A similar example might be when a terminal 12 such as a camera first powers up, the network device 10 can be ready for a change in current. In these cases, the important factors are the change in the current and the time at which the change occurs, not just the average or DC value. It is useful to analyze abrupt requests for power that are not present in the current profile of the end device. Note that a communications mechanism referred to as "common mode" communication may be used between the network device 10 and the terminal 12. In POE systems, common mode communications includes modulating the power supply by sending current pulses from the terminal 12 to the network device 10 and the network device 10 chop-modulating its power supply to reply. It may also be desirable to communicate changes of power requirements ahead of time based on an instruction to the terminal 12 that requires certain operations to take place to avoid false alarms.

Whenever the methods of FIG. 5 or FIG. 6 cause the communications link 14 to be disabled, various subsequent steps can be taken. For example, the communications link 14 might just be enabled again, within some retry limit, on the theory that the link event may have been something transitory and not in fact an intruder. Alternatively, the link might remain disabled until some authority issues an override. Another option is to re-enable the link 14 but only for specific applications that are not security-sensitive, such as an IP phone calling an emergency number. Potentially, secured electronic keys capable of supplying passwords may be used to supply passwords over the communications link 14 to either end device (network device 10 or terminal 12) in advance of data transfer after an intrusion is detected.

The technique of FIG. 6 can work in conjunction with the link going down as mentioned above. Also, the POE circuitry 36-1 is capable of detecting an open cable, i.e., an unplugged cable, a cable short, etc. If a short were to occur, an effort can be made to locate the short along the cable using the TDR circuitry 36-3, and possibly using the POE circuitry 36-2 itself before the power is shut down. If the terminal 12 is an emergency phone, it could be re-enabled right away but a message can be sent to a system manager to investigate the reason for the shutdown. If the terminal 12 is shut down during normal hours of operation causing inline power to shut off (e.g., the cable is unplugged), the terminal 12 (e.g. phone or camera) may ask the user for a password before resuming operation. After hours, the terminal 12 may be enabled again but an authority is notified of the event. These are examples of security actions that can be taken in response to the detected event.

Since the current and voltages of inline power can be measured on both ends of the link 14, the DC drop or power dissipated in the link 14 can be measured. This value can be stored in the memory 34 and shared among devices attached to the link 14 for future references to detect changes in cable length and/or the insertion of any additional series element (inline taps).

DC and AC current profiles of specific authorized terminals 12 (e.g., known camera types or phone types) may be stored and associated with specific ports on the network device 10 as to not allow other devices to be powered. If an intruder tries to plug in his own terminal 12 (e.g. camera), it will not work unless it has a current profile matching one of the stored current profiles, or unless there is some explicit authorization step such as having a user supply a password to the network device 10. Such a password could be supplied by a user interface on the network device 12, or it may be supplied via the communications link 14, for example as a series of current pulses supplied by the terminal 12 during the POE classification process (per 802.3af). That is, the terminal 12 can supply a special identifier (ID) through inline power mechanisms before it is given power permanently. Such an ID may also be extracted at a port upon installation and stored in the memory 34 to insure that no other device may be powered from this port without the right permission. A password can also be delivered to the network device 10 via a wireless channel, e.g. 802.11 data, or common-mode communications via the communications link 14 and the POE circuitry 36-2.

As another precaution, it may be desirable to require that certain terminals 12 only be permitted to exchange data with the network device 10 if the network device 10 is supplying inline power to it. This approach can help protect against an intruder 16 who supplies power to a terminal 12 in an effort to control it.

It will be appreciated that there may be other types of secure communications modes than GbE. As an example, it may be desirable to operate using the binary levels and signaling rates of 10BaseT or 100BaseT but on only a single twisted pair in a full duplex fashion, using echo cancelling within each receiver to recover the information transmitted from the far end. It should be noted that such a technique does not comply with current Ethernet standards, and thus it would require either a change to the standards or the use of proprietary equipment at both ends. It will be appreciated that any number of pairs may be used, such that transmission rates of 100, 200, 300 and 400 Mb/s full duplex could be achieved, without the use of the more complex multi-level signaling employed in GbE.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method of operating a communications port of a network communications device, comprising:
    maintaining capability information indicating that under normal operating conditions a communications link coupled to the communications port is capable of operating in a secure mode in which communications signals of the communications link are unintelligible to an intruder having an unauthorized physical connection to the communications link;
    detecting occurrence of a link event of a type that can invoke an automatic communications-mode control mechanism to change the operating of the communications link to a non-secure mode in which communications signals of the communications link are intelligible to such an intruder; and
    based on the capability information, responding to the detected occurrence of the link event by preventing the automatic communications mode control mechanism from changing the operating of the communications link to the non-secure mode, wherein the automatic communications-mode control mechanism comprises an auto-negotiation process conducted between the communications port and an end device coupled to the communications link, the auto-negotiation process being conducted in a secure mode to impede the detection of the content of the auto-negotiation process, and wherein standard auto-negotiation pulses are employed to serve as enemy indicators indicating the presence of the powered device, and non-standard signals are employed to serve as link negotiators to force operation of the communications link in the secure mode.

2. A method according to claim 1, wherein the secure mode includes simultaneous transmission on the communications link by the communications port and an end device coupled to the communications link such that the communications signals of the communications link represent an electrical summation of respective signals transmitted by the communications port and the end device, and further comprising performing an echo cancellation at the communications port to subtract the signal transmitted by the communications port from the communications signals of the communications link and thereby recover data transmitted by the end device.

3. A method according to claim 2, wherein the communications link comprises a number of twisted pairs and transmission on the communications link comprises (1) demultiplexing a single data signal into the number of partial data signals and (2) transmitting each partial data signal over a corresponding one of the twisted pairs.

4. A method according to claim 3, wherein the non-secure mode includes transmission by the communications port and the end device on only respective mutually exclusive ones of the twisted pairs.

5. A method according to claim 4, wherein at least one of the twisted pairs is unused for transmission in the non-secure mode but used for transmission in the secure mode, and wherein the link event includes the occurrence of a fault on the at least one of the twisted pairs.

6. A method according to claim 1, wherein the communications port is explicitly identified as a secure port of the network communications device by one of (setting personality information, having a secure class of end device attached to the communications link, and having an end device attached to the communications link explicitly identify itself as secure).

7. A method according to claim 1, wherein the link event is selected from the group consisting of: (link down, link data errors, and drop in amplitude of the communications signals).

8. A method according to claim 1, wherein the link event includes the detection of potential changes to the link as reported by time-domain reflectometry.

9. A method according to claim 1, wherein the communications port includes power circuitry operative to supply power to an end device attached to the communications link, and wherein the link event is selected from the group consisting of: (a mismatch between an amount of power supplied to communications link by the power circuitry and an amount of power known to be drawn by the end device, and a sudden drop in an amount of power being supplied by power circuitry).

10. A method according to claim 1, further including reporting the link event to a system manager responsible for determining whether the link event occurred due to activity of such an intruder, and wherein preventing the automatic communications mode control mechanism from changing the operating of the communications link to the non-secure mode can be overridden by the system manager.

11. A method according to claim 1, further comprising responding to the detected occurrence of the link event by permitting only limited use of the communications link to reduce a security risk presented by such an intruder.

12. A method according to claim 11, wherein the limited use includes use for emergency-related purposes.

13. A method according to claim 1, wherein one of (inline power detection and classification identification networks, and single pair identity networks discovered using time-domain reflectometry), are operative to enable the bypassing of the automatic communications-mode control mechanism completely and force operation of the communications link in the secure mode.

14. A method according to claim 1, further comprising responding to the detected occurrence of the link event by supplying the communications link with fictitious data to fool such an intruder into thinking that the intrusion attempt is successful.

15. A communications port of a network communications device, comprising:
   a memory operative to maintain capability information indicating that under normal operating conditions a communications link coupled to the communications port is capable of operating in a secure mode in which communications signals of the communications link are unintelligible to an intruder having an unauthorized physical connection to the communications link; and
   control circuitry and specialized physical-layer (PHY) circuitry co-operative (1) to detect occurrence of a link event of a type that can invoke an automatic communications-mode control mechanism to change the operating of the communications link to a non-secure mode in which communications signals of the communications link are intelligible to such an intruder, and (2) based on the capability information, to respond to the detected occurrence of the link event by preventing the automatic communications mode control mechanism from changing the operating of the communications link to the non-secure mode,
   wherein the automatic communications-mode control mechanism comprises an auto-negotiation process conducted between the communications port and an end device coupled to the communications link, the auto-negotiation process being conducted in a secure mode to impede the detection of the content of the auto-negotiation process, and wherein standard auto-negotiation pulses are employed to serve as energy indicators indicating the presence of the powered device, and non-standard signals are employed to serve as link negotiators to force operation of the communications link in the secure mode.

16. A communications port according to claim 15, wherein the secure mode includes simultaneous transmission on the communications link by the communications port and an end device coupled to the communications link such that the communications signals of the communications link represent an electrical summation of respective signals transmitted by the communications port and the end device, and further comprising performing an echo cancellation at the communications port to subtract the signal transmitted by the communications port from the communications signals of the communications link and thereby recover data transmitted by the end device.

17. A communications port according to claim 16, wherein the communications link comprises a number of twisted pairs, and further comprising (1) a demultiplexer operative to demultiplex a single data signal into the number of partial data signals and (2) drivers operative to transmit respective ones of the partial data signals over corresponding ones of the twisted pairs.

18. A communications port according to claim 17, wherein the non-secure mode includes transmission by the communications port and the end device on only respective mutually exclusive ones of the twisted pairs.

19. A communications port according to claim 18, wherein at least one of the twisted pairs is unused for transmission in the non-secure mode but used for transmission in the secure mode, and wherein the link event includes the occurrence of a fault on the at least one twisted pairs.

20. A communications port according to claim 15, wherein the communications port is explicitly identified as a secure port of the network communications device by one of (setting personality information, having a secure class of end device attached to the communications link, and having an end device attached to the communications link explicitly identify itself as secure.

21. A communications port according to claim 15, wherein the link event is selected from the group consisting of: (link down, link data errors, and drop in amplitude of the communications signals).

22. A communications port according to claim 15, wherein the link event includes the detection of potential changes to the link as reported by time-domain reflectometry.

23. A communications port according to claim 15, further comprising power circuitry operative to supply power to an end device attached to the communications link, and wherein the link event is selected from the group consisting of: (a mismatch between an amount of power supplied to communications link by the power circuitry and an amount of power known to be drawn by the end device, and a sudden drop in an amount of power being supplied by power circuitry).

24. A communications port according to claim 15, wherein the control circuitry is further operative to report the link event to a system manager responsible for determining whether the link event occurred due to activity of such an intruder, and wherein preventing the automatic communications mode control mechanism from changing the operating of the communications link to the non-secure mode can be overridden by the system manager.

25. A communications port according to claim 15, wherein the control circuitry is further operative to respond to the detected occurrence of the link event by permitting only limited use of the communications link to reduce a security risk presented by such an intruder.

26. A communications port according to claim 15, wherein the limited use includes use for emergency-related purposes.

27. A communications port according to claim 15, wherein one of (inline power detection and classification identification networks, and single pair identity networks discovered using time-domain reflectometry), are operative to enable the bypassing of the automatic communications-mode control mechanism completely and force operation of the communications link in the secure mode.

28. A communications port according to claim 15, further comprising responding to the detected occurrence of the link event by supplying the communications link with fictitious data to fool such an intruder into thinking that the intrusion attempt is successful.

* * * * *

UNITED STATES PATENT AND TRADEMARK OFFICE
CERTIFICATE OF CORRECTION

PATENT NO. : 7,752,672 B2  Page 1 of 1
APPLICATION NO. : 11/375991
DATED : July 6, 2010
INVENTOR(S) : Roger Karam et al.

It is certified that error appears in the above-identified patent and that said Letters Patent is hereby corrected as shown below:

Claim 1, Column 12, Line 7, "to serve as enemy indicators indicating the presence of" should read --to serve as energy indicators indicating the presence of--.

Signed and Sealed this

Thirty-first Day of August, 2010

David J. Kappos
*Director of the United States Patent and Trademark Office*